(12) United States Patent
Huang (10) Patent No.: US 11,580,771 B2
(45) Date of Patent: Feb. 14, 2023

(54) IMAGE CAPTURING APPARATUS

(71) Applicant: Shanghai Harvest Intelligence Technology Co., Ltd., Shanghai (CN)

(72) Inventor: Jiandong Huang, Shanghai (CN)

(73) Assignee: Shanghai Harvest Intelligence Technology Co., Ltd., Shanghai (CN)

( * ) Notice: Subject to any disclaimer, the term of this patent is extended or adjusted under 35 U.S.C. 154(b) by 81 days.

(21) Appl. No.: 17/071,765

(22) Filed: Oct. 15, 2020

(65) Prior Publication Data

US 2021/0117641 A1 Apr. 22, 2021

(30) Foreign Application Priority Data

Oct. 18, 2019 (CN) .......................... 201910993808.7

(51) Int. Cl.
*G02F 1/1335* (2006.01)
*G06V 40/13* (2022.01)
*G02F 1/133* (2006.01)

(52) U.S. Cl.
CPC ...... *G06V 40/1318* (2022.01); *G02F 1/13306* (2013.01); *G02F 1/133528* (2013.01)

(58) Field of Classification Search
CPC ............ G06V 40/1318; G02F 1/13306; G02F 1/133528; G02F 1/13338
See application file for complete search history.

(56) References Cited

U.S. PATENT DOCUMENTS

| | | |
|---|---|---|
| 10,078,777 B2 | 9/2018 | Kim et al. |
| 10,983,619 B2 | 4/2021 | Tan |
| 2018/0060642 A1 | 3/2018 | Kim et al. |
| 2019/0004388 A1* | 1/2019 | Qiu .......................... G09F 9/372 |
| 2019/0220124 A1 | 7/2019 | Tan |

(Continued)

FOREIGN PATENT DOCUMENTS

| | | |
|---|---|---|
| CN | 107238961 A | 10/2017 |
| CN | 107480584 A | 12/2017 |

(Continued)

OTHER PUBLICATIONS

First Chinese Office Action regarding Application No. 201910993808.7 dated Mar. 3, 2022. English translation provided by Unitalen Attorneys at Law.

*Primary Examiner* — Mariam Qureshi
(74) *Attorney, Agent, or Firm* — Harness, Dickey & Pierce, P.L.C.

(57) ABSTRACT

The present disclosure provides an image capturing apparatus, including: a light source module having a first surface and a second surface opposite to each other along a thickness direction; an LCD module having a first surface and a second surface opposite to each other along the thickness direction; a light-transmitting cover plate having a first surface and a second surface opposite to each other along the thickness direction, wherein the first surface of the light-transmitting cover plate is configured to contact with an object to be captured, and the second surface of the light-transmitting cover plate is configured to face the first surface of the LCD module; and a sensor module configured to collect an incident light reflected by the light-transmitting cover plate. The present disclosure can realize image capturing based on the principle of total reflection under an LCD screen, optimize imaging effect, and improve imaging clarity.

7 Claims, 4 Drawing Sheets

(56) References Cited

U.S. PATENT DOCUMENTS

2020/0292848 A1* 9/2020 Yadin ..................... G02C 7/083
2021/0133417 A1    5/2021 Tan
2021/0142026 A1    5/2021 Hao et al.
2021/0341779 A1* 11/2021 Okita ................. G02F 1/13338

FOREIGN PATENT DOCUMENTS

| CN | 107784262 A | 3/2018 | | |
|----|----|----|----|----|
| CN | 108734134 A | 11/2018 | | |
| CN | 110135405 A | 8/2019 | | |
| CN | 110244482 A | 9/2019 | | |
| EP | 3809326 A1 | * | 4/2021 | ......... G02F 1/13312 |
| WO | WO-2017074097 A1 | 5/2017 | | |

* cited by examiner

IMAGE CAPTURING APPARATUS

CROSS-REFERENCE TO RELATED APPLICATIONS

The present application claims the benefit of priority to Chinese patent application No. 201910993808.7, filed on Oct. 18, 2019, entitled "Image Capturing Apparatus", the entire disclosures of which are incorporated herein by reference.

TECHNICAL FIELD

The present disclosure relates to the technical field of image capturing, and more particularly to an image capturing apparatus.

BACKGROUND

With the development of information technology, biometric technology plays an increasingly important role in ensuring information security, among which fingerprint identification has become one of the key technologies widely used in the field of mobile internet for identity recognition and device unlocking.

In the trend of larger and larger screen-to-body ratio of intelligent devices, a traditional capacitive fingerprint identification technology has been unable to meet the demand. However, ultrasonic fingerprint identification technology has problems in technology maturity and cost. Thus, an optical fingerprint identification technology is promising to become a mainstream technology scheme of fingerprint identification.

An existing optical fingerprint identification scheme is based on the imaging principle of geometric optical lens. Generally, a fingerprint module includes components such as a microlens array, an optical spatial filter and so on, which have many disadvantages such as complex structure, thick module, small sensing range and high cost, etc.

Compared with the existing optical fingerprint identification scheme, a non-lens optical under-screen fingerprint identification technology based on the total reflection imaging principle of physical optics has the advantages of simple structure, thin module, large sensing range and low cost, etc.

On the other hand, a display screen of an intelligent device mainly adopts a liquid crystal display (LCD) and an organic light emitting diode (OLED). In contrast, an LCD screen has the advantages of low cost and easy manufacturing.

However, the existing fingerprint scheme under the LCD screen can only capture images based on ordinary reflection, and thus has poor imaging effect and low image clarity.

SUMMARY

Embodiments of the present disclosure provide an image capturing apparatus, in order to realize image capturing based on the principle of total reflection under an LCD screen.

In some embodiments, the image capturing apparatus includes: a light source module having a first surface and a second surface opposite to each other along a thickness direction; an LCD module having a first surface and a second surface opposite to each other along the thickness direction, wherein the second surface of the LCD module is attached to the first surface of the light source module; a light-transmitting cover plate having a first surface and a second surface opposite to each other along the thickness direction, wherein the first surface of the light-transmitting cover plate is configured to contact with an object to be captured, and the second surface of the light-transmitting cover plate is configured to face the first surface of the LCD module; and a sensor module configured to collect an incident light reflected by the light-transmitting cover plate.

In some embodiments, a bonding material is filled between the second surface of the LCD module and the first surface of the light source module.

In some embodiments, the image capturing apparatus further includes an electrode coupled with the LCD module, wherein the electrode is configured to control a difference between polarization states of the incident light with different incident angles in the LCD module within a tolerance error range.

In some embodiments, the LCD module comprises a liquid crystal layer, and a voltage is applied to the liquid crystal layer by the electrode to adjust a refractive index of the liquid crystal layer.

In some embodiments, applying the voltage to the liquid crystal layer by the electrode to adjust the refractive index of the liquid crystal layer comprises applying different voltages to different regions of the liquid crystal layer by the electrode so that a great adjustment of the refractive index can be obtained for the regions with the incident light of great incident angles.

In some embodiments, for a same region of the liquid crystal layer, the voltage applied to the region by the electrode changes with the incident angle of the incident light incident on the region.

In some embodiments, when a dielectric anisotropy of a liquid crystal material filled in the region is greater than zero, the voltage applied to the region by the electrode increases with the increase of the incident angle of the incident light incident on the region; and when the dielectric anisotropy of the liquid crystal material filled in the region is less than zero, the voltage applied to the region by the electrode decreases with the increase of the incident angle of the incident light incident on the region.

In some embodiments, the LCD module comprises an upper polarizer, a color filter, an upper light-transmitting plate, a liquid crystal layer, a lower light-transmitting plate and a lower polarizer disposed sequentially along a first direction, where the first direction is from the first surface to the second surface of the LCD module.

In some embodiments, the sensor module is integrated onto the upper light-transmitting plate or the lower light-transmitting plate.

In some embodiments, the sensor module is disposed between the light-transmitting cover plate and the LCD module.

Compared with conventional technologies, embodiments of the present disclosure have following beneficial effects.

According to embodiments of the present disclosure, the image capturing apparatus includes a light source module having a first surface and a second surface opposite to each other along a thickness direction; an LCD module having a first surface and a second surface opposite to each other along the thickness direction, wherein the second surface of the LCD module is attached to the first surface of the light source module; a light-transmitting cover plate having a first surface and a second surface opposite to each other along the thickness direction, wherein the first surface of the light-transmitting cover plate is configured to contact with an object to be captured, and the second surface of the light-transmitting cover plate is configured to face the first surface of the LCD module; and a sensor module configured to collect an incident light reflected by the light-transmitting cover plate.

Compared with the existing LCD image capturing apparatus, the embodiments of the present disclosure can realize image capturing based on the principle of total reflection for a device with an LCD screen, optimize the imaging effect and improve the imaging clarity. Specifically, the LCD module is attached to the light source module, so that the light source module can be packaged with the LCD module in the image capturing apparatus as an integrated part. In this way, the influence of an air gap between the LCD module and the light source module on the imaging result can be eliminated, the total reflection of the incident light emitted by the light source module occurring when the incident light reaches the LCD module can be avoided, and incident light with large angles can be ensured to enter the LCD module, and thus the total reflection can occur on the light-transmission cover plate, which makes it possible to capture images based on the principle of total reflection.

Furthermore, the image capturing apparatus further includes an electrode coupled with the LCD module and configured to control a difference between polarization states of the incident light with different incident angles in the LCD module within a tolerance error range. Compared with the existing LCD screen, the image capturing apparatus according to embodiments of the present disclosure can eliminate the air gap, and thus enables the incident light with large angle to enter the LCD module. As the increase of the incident angle will lead to the increase of the difference between the polarization states of the incident light in the LCD module, the image capturing apparatus according to embodiments of the present disclosure can effectively reduce the difference between the polarization states by optimizing electrode design. Thus, complete extinction of light with incident angles smaller than the critical angle of total reflection in the screen can be obtained, and light passing through the LCD module in an off state can be avoided, which makes it possible to realize a total darkness for the LCD module.

DETAILED DESCRIPTION

As described in the background art, the existing fingerprint scheme under the LCD screen can only capture images based on ordinary reflection, and thus has poor imaging effect and low image clarity.

Figure 1:
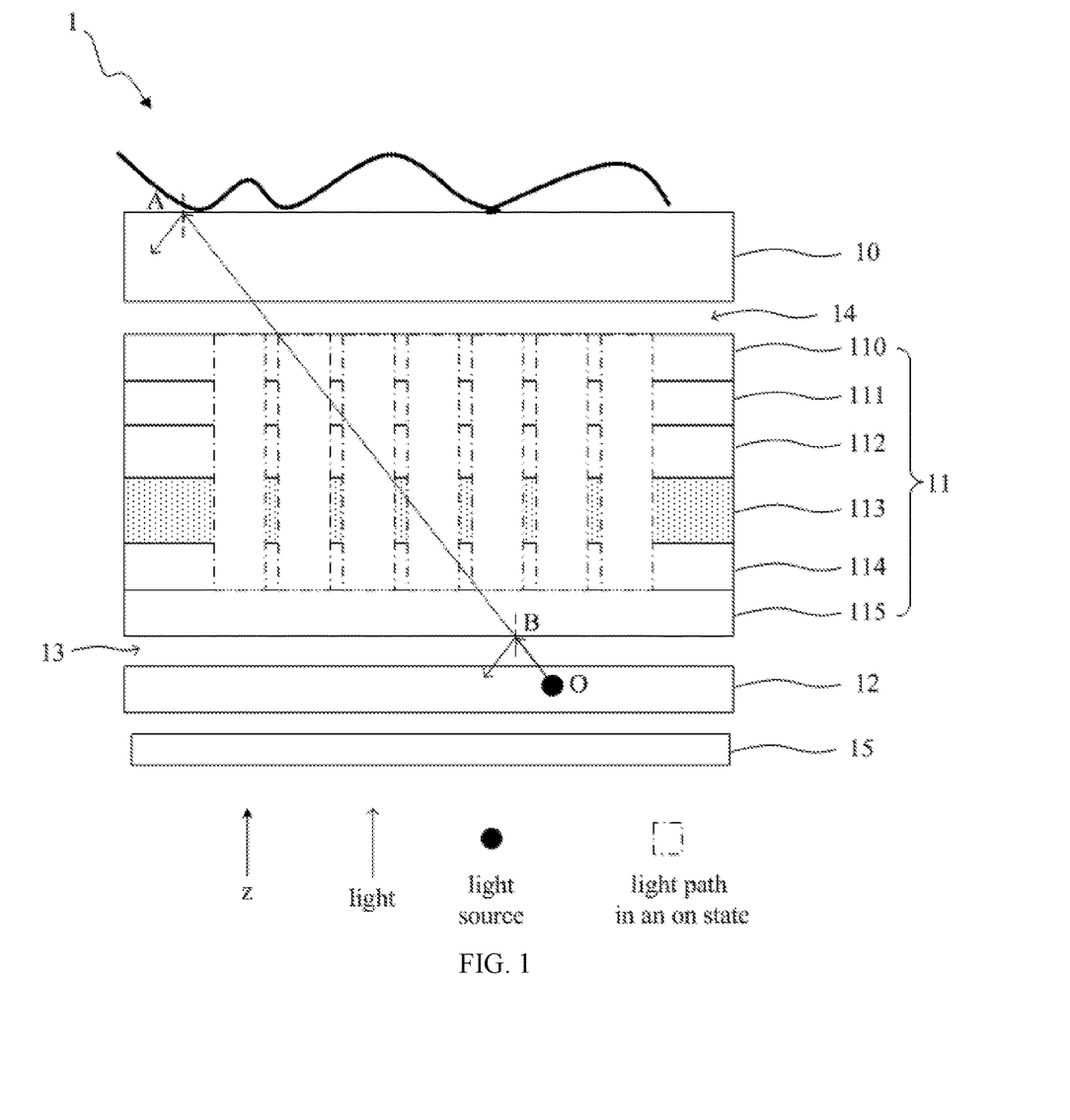
FIG. 1 is a schematic view of an LCD fingerprint sensor in the existing technology.

Specifically, referring to FIG. 1, along a thickness direction (z direction as shown in the figure), an existing LCD fingerprint sensor 1 sequentially includes a light-transmitting cover plate 10, an LCD stack 11, a backlight module 12 and a sensor module 15 from top to bottom.

In Z direction, the LCD stack 11 sequentially includes an upper polarizer 110, a color filter 111, an upper light-transmitting plate 112, a liquid crystal layer 113, a lower light-transmitting plate 114 and a lower polarizer 115 from top to bottom.

In FIG. 1, rectangular areas marked by dotted lines are light paths, and each light path corresponds to a pixel unit on the sensor module 15. Therefore, one light path represents one LCD pixel.

The upper polarizer 110 and the lower polarizer 115 work together to cause the LCD pixel to be in an off state in which light is not allowed to pass through. If the light path is in an off state when the LCD fingerprint sensor 1 is powered off, light cannot pass through the LCD stack 11 to reach the light-transmitting cover plate 10.

The upper polarizer 110 and the lower polarizer 115 work together to cause the LCD pixel to be in an on state in which the light is allowed to pass through. As shown in FIG. 1, the light path is in an on state, and the light can pass through the LCD stack 11 to reach the light-transmitting cover plate 10 and is reflected by the light-transmitting cover plate 10, and then carry a fingerprint information of a finger placed on the other side of the light-transmitting cover plate 10 to the sensor module 15.

Further, an optical clear adhesive (OCA) layer 14 is filled between the light-transmitting cover plate 10 and the LCD stack 11.

Further, an air gap 13 is usually formed between the LCD stack 11 and the backlight module 12.

In practical application, the backlight module 12 usually reuses a display panel of an intelligent device, and other components such as the light-transmitting cover plate 10 and the LCD stack 11 are integrated and packaged into a whole beforehand, and then assembled to an appropriate position on the display panel. Thus, the backlight module 12 and other parts of the image capturing apparatus 1 are separated from each other, and the air gap 13 is naturally formed between the backlight module 12 and the image capturing apparatus 1.

Taking a light source O on the backlight module 12 as an example, if there is no air gap 13, the incident light emitted from the light source O can reach the light-transmitting cover plate 10 and be totally reflected at point A when the light path is in the on state. However, due to the existence of the air gap 13, the incident light emitted from the light source O is totally reflected when reaching the LCD stack 11, that is, at point B, and cannot actually reach the light-transmitting cover plate 10.

Therefore, due to the existence of the air gap 13, the light emitted from the backlight module 12 already undergoes a total reflection when entering the LCD stack 11, thus the LCD fingerprint sensor 1 cannot capture fingerprint images based on the principle of total reflection, and can only capture fingerprint images based on ordinary reflection. The imaging effect is poor, and the image clarity is low.

In order to solve above technical problem, embodiments of the present disclosure provide an image capturing apparatus. The image capturing apparatus includes: a light source module having a first surface and a second surface opposite to each other along a thickness direction; an LCD module having a first surface and a second surface opposite to each other along the thickness direction, wherein the second surface of the LCD module is attached to the first surface of the light source module; a light-transmitting cover plate having a first surface and a second surface opposite to each other along the thickness direction, wherein the first surface of the light-transmitting cover plate is configured to contact with an object to be captured, and the second surface of the light-transmitting cover plate is configured to face the first surface of the LCD module; and a sensor module configured to collect an incident light reflected by the light-transmitting cover plate.

The embodiments of the present disclosure can realize image capturing based on the principle of total reflection for a device with an the LCD screen, optimize the imaging effect and improve the imaging clarity. Specifically, the LCD module is attached to the light source module, so that the light source module can be packaged with the LCD module in the image capturing apparatus as an integrated part. In this way, the influence of the air gap between the LCD module and the light source module on the imaging result can be eliminated, the total reflection of the incident light emitted by the light source module occurring when the incident light reaches the LCD module can be avoided, and incident light with large angles can be ensured to enter the LCD module, and thus the total reflection can occur on the light-transmission cover plate, which makes it possible to capture images based on the principle of total reflection.

Next, embodiments of the present disclosure are described in detail with reference to the drawings. The same part is marked with the same reference numeral in each figure. Each embodiment is only an example, of course, the structure shown in different embodiments may be partially replaced or combined. In the variant example, the description of matters common to the first embodiment is omitted, and only different features are explained. In particular, the same effects produced by the same structure are not mentioned one by one according to each embodiment.

In order to make above purposes, features and beneficial effects of the present disclosure more obvious and understandable, specific embodiments of the present disclosure will be described in detail with the attached drawings.

Figure 2:
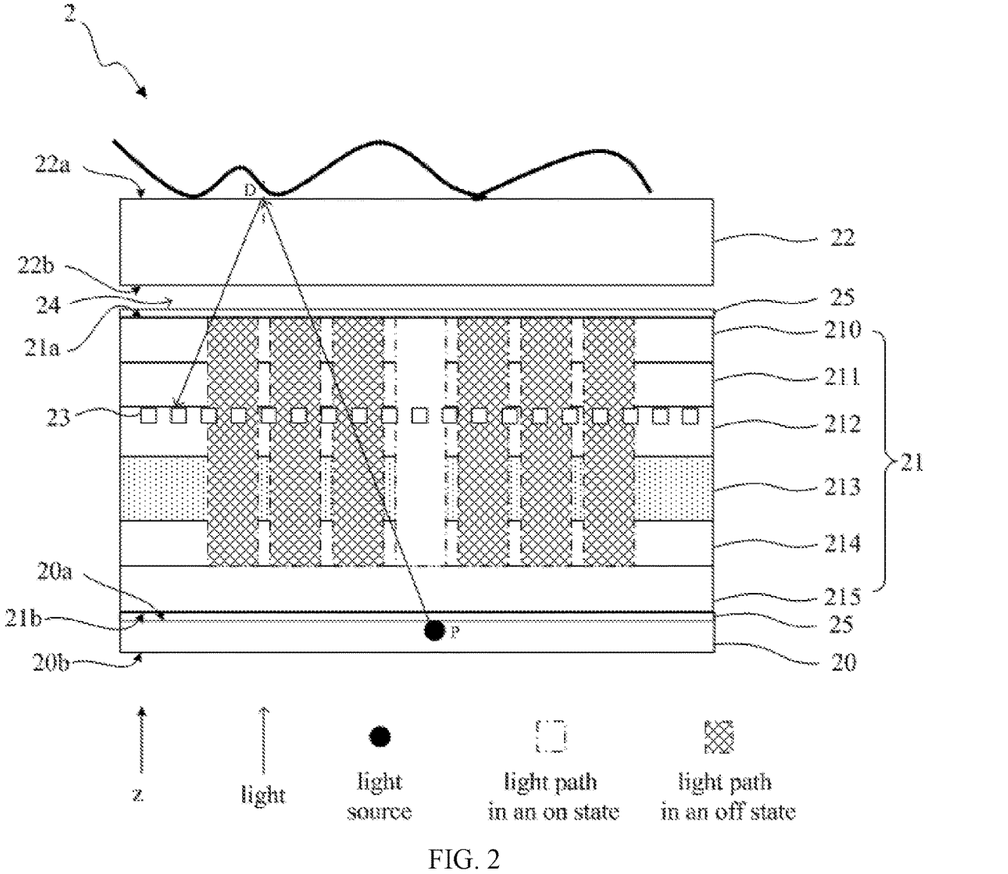
FIG. 2 is a schematic view of an image capturing apparatus according to a first embodiment of the present disclosure.

FIG. 2 is a schematic view of an image capturing apparatus 2 according to a first embodiment of the present disclosure.

The image capturing apparatus 2 may be an optical under-screen image capturing apparatus, such as an optical under-screen fingerprint capturing apparatus based on the principle of optical total reflection.

The image capturing apparatus 2 can be adapted to capture an image of an object to be captured, the object to be captured may be a finger, and the image may be a fingerprint image.

Specifically, referring to FIG. 2, the image capturing apparatus 2 may include a light source module 20, an LCD module 21, a light-transmitting cover plate 22, and a sensor module 23. The light source module 20 has a first surface 20a and a second surface 20b opposite to each other along a thickness direction (z direction). The LCD module 21 has a first surface 21a and a second surface 21b opposite to each other along the thickness direction (z direction), and the second surface 21b of the LCD module 21 is attached to the first surface 20a of the light source module 20. The light-transmitting cover plate 22 has a first surface 22a and a second surface 22b opposite to each other along the thickness direction (z direction), the first surface 22a of the light-transmitting cover plate 22 is configured to contact with an object to be captured, and the second surface 22b of the light-transmitting cover plate 22 is configured to face the first surface 21a of the LCD module 21. The sensor module 23 is configured to collect an incident light reflected by the light-transmitting cover plate 22.

In some embodiments, the sensor module 23 may be a photoelectric sensor, and includes a plurality of pixels arranged in an array. For each pixel, the pixel includes a photo diode (PD), as indicated by rectangular blocks marked by reference numeral 23 in FIG. 2.

It should be noted that the position relationship between light paths and the pixels in the figure is only an example. In practical applications, one light path may correspond to one pixel, or one light path may correspond to multiple pixels.

For example, still referring to FIG. 2, during image capturing, a voltage may be applied to a specific one or more pixels so that only the light path corresponding to the specific one or more pixels is in the on state, so as to capture local area images only.

In some embodiment, the voltage may be applied to the pixels sequentially in row or in column to turn on the light path and capture an overall image of the object to be captured.

Alternatively, all light paths of the LCD module 21 may be controlled to be on at the same time, as shown in FIG. 1, or all light paths of the LCD module 21 may be controlled to be off at the same time.

In some embodiments, the light source module 20 may be a backlight module.

In some embodiments, a bonding material may be filled between the second surface 21b of the LCD module 21 and the first surface 20a of the light source module 20 to ensure that there is no air gap between the LCD module 21 and the light source module 20.

For example, the bonding material may include an optical clear adhesive.

In some embodiments, the LCD module 21 may include an upper polarizer 210, a color filter 211, an upper light-transmitting plate 212, a liquid crystal layer 213, a lower light-transmitting plate 214, and a lower polarizer 215 disposed sequentially along a first direction, where the first direction is from the first surface 21a to the second surface 21b of the LCD module 21. For example, the upper light-transmitting plate 212 may be an upper glass plate, and the lower light-transmitting plate 214 may be a lower glass plate.

Specifically, the liquid crystal layer 213 may be made of liquid crystal material, and the light path may be controlled to be on by applying a voltage to the liquid crystal layer 213. When the voltage is not applied to the liquid crystal layer 213, the light path is off.

Furthermore, by the cooperation of the upper polarizer 210 and the lower polarizer 215, all light paths in the LCD module 21 may be on or off at the same time.

In some embodiments, the image capturing apparatus 2 may also include an electrode 25 coupled with the LCD module 21, and the electrode 25 is configured to control the difference between the polarization states of the incident light with different incident angles in the LCD module 21 within the tolerance error range.

Specifically, the electrode 25 may include an upper electrode plate and a lower electrode plate along the thickness direction (z direction as shown in the figure). The upper electrode plate may be located between the first surface 21a of the LCD module 21 and the second surface 22b of the light-transmitting cover plate 22, and the lower electrode plate may be located between the second surface 21b of the LCD module 21 and the first surface 20a of the light source module 20.

For example, one side of the lower electrode plate of the electrode 25 may be attached to the second surface 21b of the LCD module 21, and the light source module 20 may be adhered to the other side of the lower electrode plate through an optical clear adhesive.

Compared with the existing LCD screen, the image capturing apparatus 2 according to embodiments of the present disclosure can eliminate the air gap, and thus enables the incident light with large angle to enter the LCD module. As the increase of the incident angle will lead to the increase of the difference between the polarization states of the incident light in the LCD module 212, the image capturing apparatus according to embodiments of the present disclosure can effectively reduce the difference between the polarization states by optimizing electrode design, so as to better realize complete extinction of the light within the critical angle of total reflection in the screen, and prevent the light from passing through the LCD module 21 in the off state to cause the LCD module 21 to be unable to achieve total darkness.

Specifically, in order to eliminate the influence of the dependence of the polarizer extinction on the angle on the image display and image capturing effect, the image capturing apparatus 2 according to embodiments of the disclosure optimizes the electrode design, and adjusts the electric field distribution in the liquid crystal layer 213 according to the incident angle, so as to reduce the difference of phase deflection of the light under different paths as far as possible within an acceptable range.

The present disclosure utilizes the principle that the refractive index change of liquid crystal has a certain relationship with the electric field intensity there, and the electric field intensity can be adjusted through the electrode design. Thus, a voltage may be applied to the liquid crystal layer 213 by the electrode 25 to adjust the refractive index of the liquid crystal layer 213.

Specifically, liquid crystal is a kind of material with birefringence. After the incident light enters the liquid crystal layer 213, the incident light will be decomposed into two orthogonal light (hereinafter referred to as ordinary light and extraordinary light), and the refractive indexes of the ordinary light and the extraordinary light in the liquid crystal layer 213 are different. The refractive index of the extraordinary light can be changed with the change of the voltage applied to the liquid crystal layer 213, and the difference of the refractive index between the ordinary light and the extraordinary light determines the difference between the polarization states of the incident light.

The greater the incident angle, the greater the difference between the polarization states. Therefore, in order to reduce the difference between the polarization states, different voltages are applied to different regions of the liquid crystal layer 213 by the electrode 25, so that a great adjustment of the refractive index can be obtained for the regions with the incident light of great incident angles. The different regions may refer to different regions in the plane perpendicular to the thickness direction (z direction as shown in the figure).

That is to say, since the difference between the polarization states in the region with larger incident angle is greater, the adjustment of the refractive index of the region needs to be increased correspondingly, so that the difference between the polarization states in the region can be reduced to the tolerance error range.

In some embodiments, for a same region of the liquid crystal layer 213, the voltage applied to the region by the electrode changes with the incident angle of the incident light incident on the region.

For example, the light source module 20 may include point light sources arranged in an array. When the point light sources and the corresponding sensor module 23 are turned on row by row for image capturing, the incident angle of the incident light in the same region changes with the position of the point light sources which are lighted up. Therefore, according to the incident angle of the incident light incident on a specific region, the electrode 25 can adjust the voltage applied to the specific region, so that when the incident angle of the incident light incident on the specific region is small, the adjustment of the refractive index of the specific region is small; with the increase of the incident angle of the incident light incident on the specific region, the adjustment of the refractive index of the specific region gradually increases.

In a typical application scenario, referring to FIG. 2, taking the incident light emitted from a light source P as an example, for the region of the liquid crystal layer 213 directly above the light source P along the thickness direction (z direction as shown in the figure), the incident light emitted from the light source P has a smaller incident angle in this region. For the liquid crystal layer 213, except for the region directly above the light source P, the closer to the edge of the liquid crystal layer 213, the grater the incident angle of the incident light emitted from the light source P in the corresponding region.

Accordingly, when the voltage is applied to the liquid crystal layer 213 by the electrode 25, the voltage applied to the region of the liquid crystal layer 213 directly above the light source P is different from the voltage applied to other regions of the liquid crystal layer 213, so as to adjust the refractive index of the region of the liquid crystal layer 213 directly above the light source P and the refractive indexes of other regions of the liquid crystal layer 213 in various degrees.

For example, the decrease in the refractive index of the region of the liquid crystal layer 213 directly above the light source P may be smaller than the decrease in the refractive indexes of other regions of the liquid crystal layer 213, so that large angle path enhancement of the incident light emitted from the light source P entering other regions of the liquid crystal layer 213 is compensated by the decrease in the refractive index of the region, so as to achieve the effect that the phase shift of the incident light with small angle emitted from the light source P into the region of the liquid crystal layer 213 directly above the light source P is sufficiently small.

In some embodiments, for any region of the liquid crystal layer 213, when the dielectric anisotropy of the liquid crystal material filled in the region is greater than zero, the voltage applied to the region by the electrode 25 increases with the increase of the incident angle of the incident light incident on the region.

For example, liquid crystal material 5 CB and liquid crystal material E7 are two kinds of commonly used liquid crystal materials with a dielectric anisotropy greater than zero.

In some embodiments, when the dielectric anisotropy of the liquid crystal material filled in the region is less than zero, the voltage applied to the region by the electrode 25 decreases with the increase of the incident angle of the incident light incident on the region.

For example, liquid crystal material MBBA is a kind of liquid crystal material with a dielectric anisotropy less than zero.

From above, it is possible to realize the extinction of the light whose incident angle is within the critical angle of total reflection, avoid the problem of light leakage when the light path of the LCD module 21 is off, which will affect the imaging effect during image capturing or image display.

When the incident angle exceeds the critical angle of total reflection, the incident light is naturally in a waveguide state and cannot escape display (waveguide) surface, that is, the light-transmitting cover plate 22, so that it will not be observed, and light extinction will be realized.

In other words, the light in the waveguide state is the light for fingerprint detection. For example, the incident light emitted from the light source P in FIG. 2, whose incident angle is greater than the critical angle of total reflection, is totally reflected at point D of the light-transmitting cover plate 22, and the image formed through the total reflection by the light-transmitting cover plate 22 can be captured by the sensor module 23, thereby realizing the image capturing based on the principle of total reflection.

In some embodiments, the critical angle of total reflection may be about 42°.

In some embodiments, the sensor module 23 may be integrated onto the upper light-transmitting plate 212.

For example, the sensor module 23 may be integrated onto the side of the upper light-transmitting plate 212 facing the color filter 211.

In some embodiments, the sensor module 23 may be integrated onto the side of the color filter 211 facing the upper light-transmitting plate 212.

In some embodiments, the light source module 20 may be a display panel.

For example, the display panel may be selected from a liquid crystal display, an active matrix organic light emitting diode display, and a micro light emitting diode display.

In some embodiments, the light-transmitting cover plate 22 may be made of glass material.

Specifically, the light-transmitting cover plate 22 may be integrated with protection and touch functions.

When the image capturing apparatus 2 is used for optical under-screen fingerprint identification, the first surface 22a of the light-transmitting cover plate 22 can be used to contact fingerprints.

In some embodiments, an optical clear adhesive layer 24 may be filled between the light-transmitting cover plate 22 and the LCD module 21. For example, the first surface 21a of the LCD module 21 may be adhered to the second surface 22b of the light-transmitting cover plate 22 by an optical clear adhesive.

From above, the embodiments of the present disclosure can realize image capturing based on the principle of total reflection under the LCD screen, optimize the imaging effect and improve the imaging clarity. Specifically, the LCD module is attached to the light source module, so that the light source module can be packaged with the LCD module in the image capturing apparatus as an integrated part. In this way, the influence of an air gap between the LCD module and the light source module on the imaging result can be eliminated, the total reflection of the incident light emitted by the light source module when the incident light reaches the LCD module can be avoided, and incident light with large angles can be ensured to enter the LCD module smoothly, and thus the total reflection can occur on the light-transmission cover plate, which make it possible to capture images based on the principle of total reflection.

Figure 3:
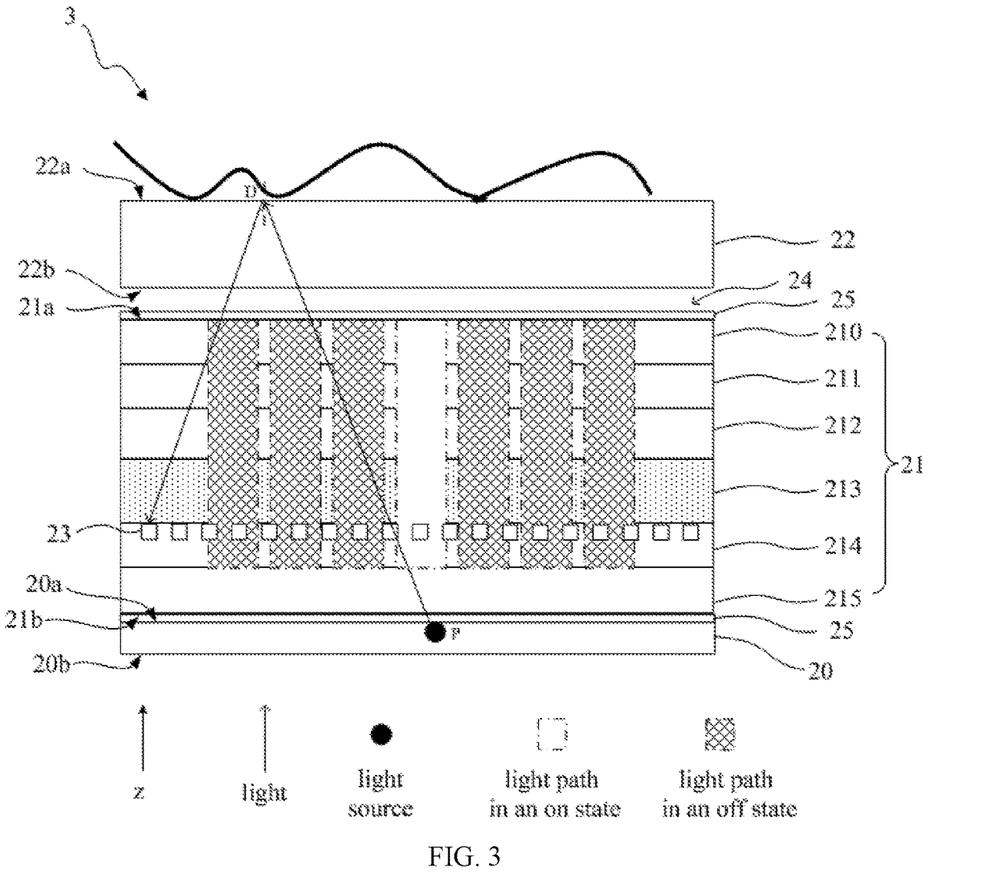
FIG. 3 is a schematic view of an image capturing apparatus according to a second embodiment of the present disclosure.

FIG. 3 is a schematic view of an image capturing apparatus 3 according to a second embodiment of the present disclosure. Here, only the differences between the image capturing apparatus 3 and the image capturing apparatus 2 shown in FIG. 2 are mainly described.

In some embodiments, the main difference from the image capturing apparatus 2 shown in FIG. 2 is that the sensor module 23 may be integrated onto the lower light-transmitting plate 214.

For example, the sensor module 23 may be integrated onto the side of the lower light-transmitting plate 214 facing the liquid crystal layer 213.

In some embodiment, the lower light-transmitting plate 214 may be integrated with a thin film transistor (TFT). Further, the photo diodes and the TFT may be distributed on a surface of the lower light-transmitting plate 214 in parallel.

Compared with the image capturing apparatus 3 shown in FIG. 3, in the image capturing apparatus 2 shown in FIG. 2, the sensor module 23 disposed on the upper light-transmitting plate 212 has a higher light transmission rate, which is conducive to obtaining a clear image. Specifically, the closer the sensor module 23 is to the light-transmitting cover plate 22, the shorter the return distance of the total reflection light carrying fingerprint information, so that the light absorption efficiency is higher.

On the other hand, since the photo diodes take up areas, when the sensor module 23 is disposed on the upper light-transmitting plate 212, the photo diodes and the TFT on the lower light-transmitting plate 214 can be aligned in the thickness direction, thereby increasing light transmittance.

Compared with the image capturing apparatus 2 shown in FIG. 2, the image capturing apparatus 3 shown in FIG. 3 is easier to implement in the manufacturing process, and has low manufacturing process complexity.

Figure 4:
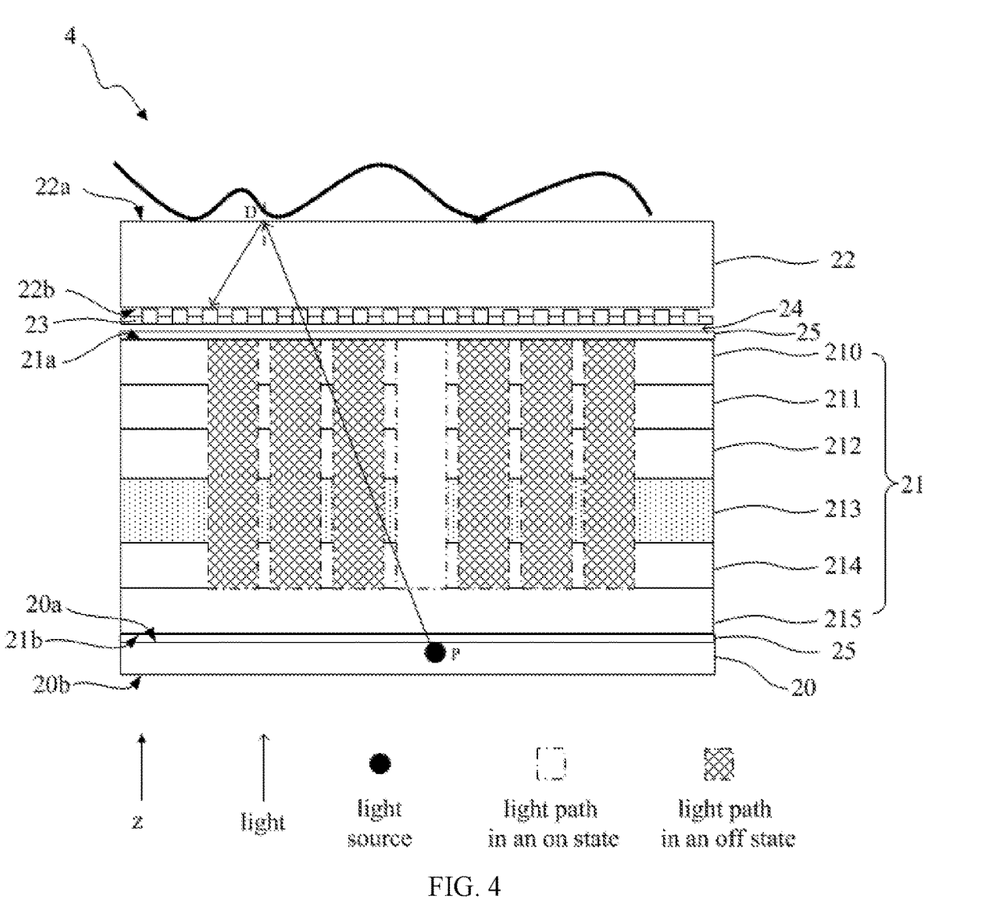
FIG. 4 is a schematic view of an image capturing apparatus according to a third embodiment of the present disclosure.

FIG. 4 is a schematic view of an image capturing apparatus 4 according to a third embodiment of the present disclosure. Here, only the differences between the image capturing apparatus 4 and the image capturing apparatus 2 shown in FIG. 2 are mainly described.

In some embodiments, the main difference from the image capturing apparatus 2 shown in FIG. 2 is that the sensor module 23 may be disposed between the light-transmitting cover plate 22 and the LCD module 21.

For example, the sensor module 23 may be disposed between the second surface 22b of the light-transmitting cover plate 22 and the first surface 21a of the LCD module 21, and other gaps between the light-transmitting cover plate 22 and the LCD module 21 may still be filled with the optical clear adhesive.

In some embodiments, the sensor module 23 may be disposed close to the second surface 22b of the light-transmitting cover plate 22 to obtain a higher light transmittance.

Alternatively, the sensor module 23 may also be disposed close to the first surface 21a of the LCD module 21.

In some embodiments, the sensor module 23 may be made of transparent material to avoid affecting the image display effect of the display panel at a non-image capturing stage.

In some embodiments, display and sensing may be executed in a time-sharing manner. That is to say, during image display, the sensor module 23 is not applied with voltage, and the image of the light source module 20 can be displayed outwards through the light-transmitting cover plate 22 without being blocked by the sensor module 23; and during image capturing, the sensor module 23 is applied with voltage to obtain the image of the object to be captured.

As a result, the sensor module 23 is disposed externally, and the total reflection light can be captured without changing other processes of the LCD module 21, except for the integration of the light source module 20, which is conducive to reducing the manufacturing process complexity.

The image capturing apparatus 2, the image capturing apparatus 3 and the image capturing apparatus 4 according to the embodiments of the present disclosure can be applied to electronic devices such as mobile phones, smart bracelets, wristwatches, etc.

Although the present disclosure has been disclosed above, the present disclosure is not limited thereto. Any changes and modifications may be made by those skilled in the art without departing from the spirit and scope of the present disclosure, and the scope of the present disclosure should be determined by the appended claims.

The invention claimed is:

1. An image capturing apparatus, comprising:
a light source module having a first surface and a second surface opposite to each other along a thickness direction;
an LCD module having a first surface and a second surface opposite to each other along the thickness direction, wherein the second surface of the LCD module is attached to the first surface of the light source module;
a light-transmitting cover plate having a first surface and a second surface opposite to each other along the thickness direction, wherein the first surface of the light-transmitting cover plate is configured to contact with an object to be captured, and the second surface of the light-transmitting cover plate is configured to face the first surface of the LCD module; and
a sensor module configured to collect an incident light reflected by the light-transmitting cover plate,
wherein the LCD module comprises a liquid crystal layer, and a voltage is applied to the liquid crystal layer by an electrode coupled with the LCD module to adjust a refractive index of the liquid crystal layer,
wherein for a same region of the liquid crystal layer, the voltage applied to the region by the electrode changes with the incident angle of the incident light incident on the region, and
wherein when a dielectric anisotropy of a liquid crystal material filled in the region is greater than zero, the voltage applied to the region by the electrode increases with the increase of the incident angle of the incident light incident on the region; and when the dielectric anisotropy of the liquid crystal material filled in the region is less than zero, the voltage applied to the region by the electrode decreases with the increase of the incident angle of the incident light incident on the region.

2. The image capturing apparatus according to claim 1, wherein a bonding material is filled between the second surface of the LCD module and the first surface of the light source module.

3. The image capturing apparatus according to claim 1, wherein the electrode is configured to control a difference between polarization states of the incident light with different incident angles in the LCD module within a tolerance error range.

4. The image capturing apparatus according to claim 1, wherein applying the voltage to the liquid crystal layer by the electrode to adjust the refractive index of the liquid crystal layer comprises applying different voltages to different regions of the liquid crystal layer by the electrode so that a great adjustment of the refractive index can be obtained for the regions with the incident light of great incident angles.

5. The image capturing apparatus according to claim 1, wherein the LCD module comprises an upper polarizer, a color filter, an upper light-transmitting plate, a liquid crystal layer, a lower light-transmitting plate and a lower polarizer disposed sequentially along a first direction, where the first direction is from the first surface to the second surface of the LCD module.

6. The image capturing apparatus according to claim 5, wherein the sensor module is integrated onto the upper light-transmitting plate or the lower light-transmitting plate.

7. The image capturing apparatus according to claim 5, wherein the sensor module is disposed between the light-transmitting cover plate and the LCD module.

* * * * *